United States Patent [19]

Marx et al.

[11] Patent Number: 4,896,307

[45] Date of Patent: Jan. 23, 1990

[54] MICROCOMPUTER-CONTROLLED PROGRAMMABLE TIME SWITCH

[75] Inventors: Juergen Marx, Nuremberg; Manfred Baumgaertner, Fuerth, both of Fed. Rep. of Germany

[73] Assignee: Siemens Aktiengesellschaft, Munich, Fed. Rep. of Germany

[21] Appl. No.: 336,764

[22] Filed: Apr. 12, 1989

[30] Foreign Application Priority Data

Apr. 25, 1988 [DE] Fed. Rep. of Germany ....... 3813921

[51] Int. Cl.$^4$ ...................... G04B 19/30; G04C 19/00
[52] U.S. Cl. ...................................... 368/70; 368/82; 368/108; 368/223
[58] Field of Search .............................. 368/10, 69–70, 368/82, 107–113, 223; 364/569; 340/309.15, 309.4

[56] References Cited

U.S. PATENT DOCUMENTS 4,444,511  4/1984  Ogihara et al. ........................ 368/70
4,725,997  2/1988  Urquhart et al. .................... 368/109

Primary Examiner—Vit W. Miska
Attorney, Agent, or Firm—Kenyon & Kenyon

[57] ABSTRACT

A microcomputer-controlled programmable time switch has a display for the acutal time and other functions. The other functions are obtained through easily understood legends, with keys for each individual function and with keys for the input, indication and erasure of time-dependent data and for the actuating of the switch independently of the time. If the sequence of operation is not arbitrary, the microcomputer guides an operator through the operating sequence by flashing the indicator lights required for the data readout or data input.

6 Claims, 6 Drawing Sheets

MICROCOMPUTER-CONTROLLED PROGRAMMABLE TIME SWITCH

FIELD OF THE INVENTION

The present invention relates to a microcomputer-controlled programmable device for a time switch for the connecting and disconnecting of an electrically controllable apparatus, with setting keys for the selection of data and data groups appearing on a display. Selection keys select the data and data groups to be selected. Indicator lights associated with individual keys flash until action of the associated key.

BACKGROUND OF THE INVENTION

The purpose of time switch clocks is connecting and disconnecting electrically controllable apparatus, such as space heating systems, at given pre-set times. Additional functions can also be performed manually or by means of the time switch clock, such as the connecting and disconnecting of the device by manual operation, for example. Mechanical time switch clocks have recently been increasingly replaced by electronic time switch clocks. The electronic time switch clocks provide additional capabilities, such as connecting and disconnecting at different times on individual days of the week. It is thus possible to store a time program for connecting and disconnecting on each individual day of the week or for a group of days and to access the program on individual weekdays.

One such microcomputer-controlled program-setting device used as a heating regulator is known, for instance, from the journal "Elektronikpraxis" No. 10, October 1981, pages 154 and 155. The control device of the heating regulators is so constructed that it has an electronic time switch clock which can be set in conventional manner, a microcomputer and a function switch. The individual stages of the function switch make it possible to set the time, to store a program for connecting and disconnecting, to associate the connecting and disconnecting with individual days of the week, and to effect a permanent connection or disconnection of the attached device.

This known program setting device has the disadvantage that the programming requires specialized knowledge. When there is only occasional use of the control device, such as for re-programming due to holidays, the previously acquired knowledge of operation is frequently forgotten between the uses so that the operating instructions must in each case be consulted again. This is inconvenient, on the one hand, and on the other hand, there is the possibility that the operating instructions have been misplaced.

There is a need for a program-setting device which guides the operator by interrelating the operating and indicating elements in an easily understandable manner. The device should position them in such a logical way that even a technically inexperienced operator can effect the programming without operating instructions. For this purpose it is also necessary that erroneous manipulations do not invalidate the already properly programmed part but, instead, the error is tolerated or indicated as such and the proper procedure is shown. The operating of the keys should furthermore be adapted to each individual sequence of thought, i.e. there should not be required a specific sequence in the setting of the various parameters which can only be ascertained from the operating instructions.

SUMMARY OF THE INVENTION

These and other needs are met by the present invention which provides a microcomputer controlled programmable time switch for connecting and disconnecting an electrically controllable device. The time switch has a set of selection keys that select which data from a plurality of data groups is to be set. A set of setting keys have individual functions and set the selected data. A display acts to display the data groups, and has indicator lights that are associated with the setting keys. These indicator lights that indicate data groups have corresponding legends that are clearly associated with the indicator lights. A microcomputer is coupled to the selection keys and the setting keys. It has data and shift registers that receive input of the individual functions. The selection keys provide cyclical selection of particular data from the data groups, the microcomputer having means for storing the data. A first of the data groups is a function selection, a second of the data groups is the days of the week, and a third of the data groups is the time. The data includes inputs, readout, erasing, and connecting and disconnecting of the device. The microcomputer includes means for guiding data input by flashing the indicator lights, with unguided data inputs being enterable in any sequence. The microcomputer automatically stores data required for a complete data input after all such data has been set.

With the invention as described above, an operator merely has to verify the actual time and, if necessary, correct it, to determine the times of connecting and disconnecting for each day of the week, enter them and, after completion of the entry, verify the stored data by readout and, if necessary, correct them. It is furthermore possible to effect in simple manner a permanent connection of the so-called "party circuit", i.e. to control the connecting and disconnecting by hand. If a given sequence must be followed for this, it will be determined by the microcomputer and indicated to the operator by a flashing of the corresponding lights. These lights are either clearly labeled or associated by arrows with the corresponding keys. If the setting is possible in any desired sequence, this will be tolerated by the setting device. It is thus, for instance, left to the operator whether, when setting the time, the hours are set first and then the minutes or vice versa. It is also up to the operator to first enter, with reference to one day, the connect time and then the disconnect time or vice versa. It is merely necessary to establish the reference to the time selected by pressing the corresponding keys "connect" or "disconnect".

The establishing of unambiguous association and ease of operation is promoted by allocating to each key only a single function, according to certain embodiments of the invention.

In some embodiments of the invention, the switching from summer time to winter time is made particularly easy and simple by the fact that the colon present between the indication of the hour and the minutes of the clock is provided with characteristic markings as a symbol for the appropriate season.

In another embodiment, the display is surrounded by a coverplate which can easily be replaced and, therefore, be provided with legends in the desired language.

In the prior art, if it is desired to deviate from the programming set on a given day, a permanent connection must normally be effected by means of a so-called "party switch", which connection must be eliminated after the end of the exceptional situation. This can easily be overlooked. In accordance, certain embodiments of the present invention, the switch remains in the party position only until the next stored switch point is reached, which then automatically eliminates the connection or continues it in the desired manner. In this way, a second actuation for the elimination of the party connection can be dispensed with.

DETAILED DESCRIPTION

Figure 1:
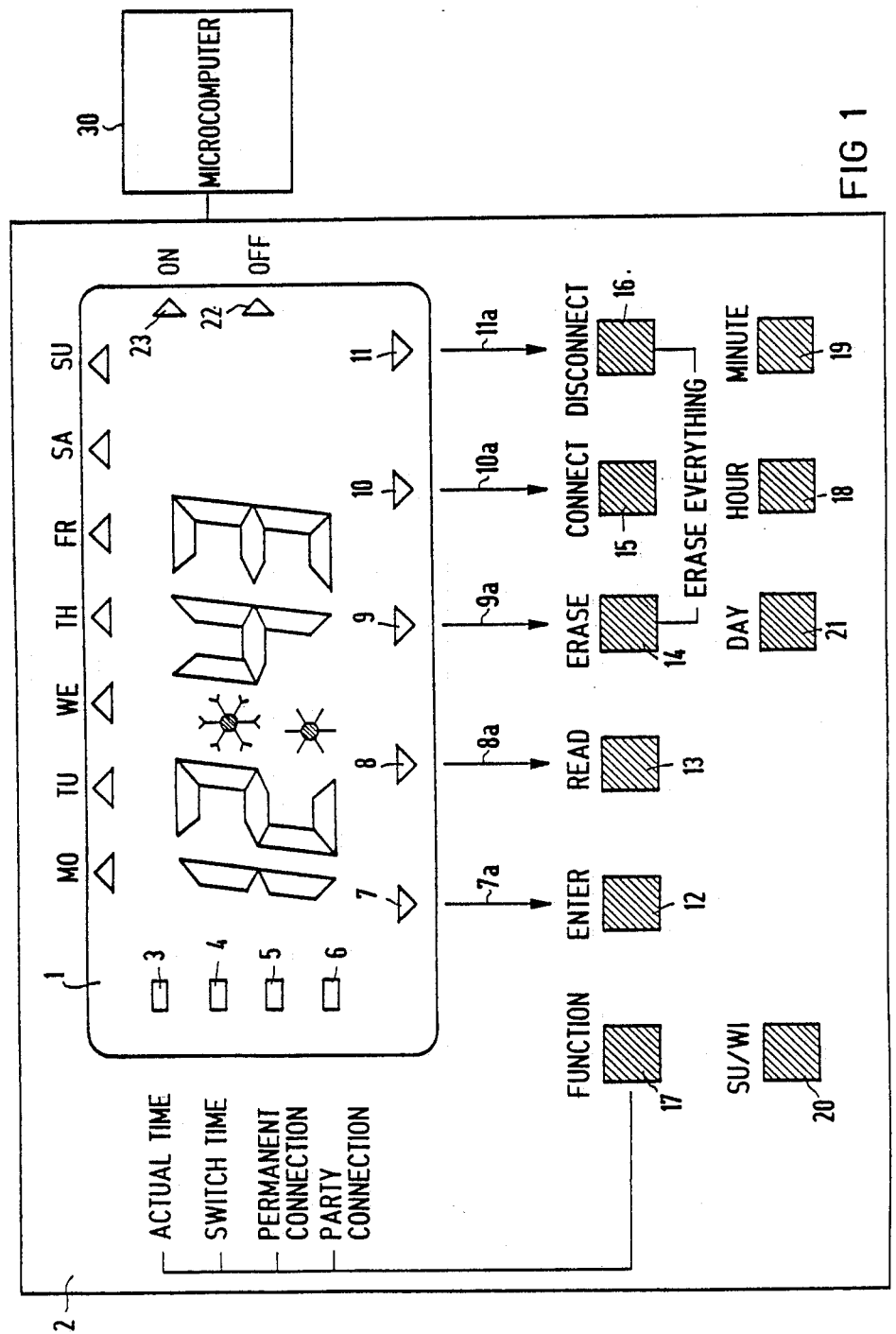
FIG. 1 illustrates an embodiment of the setting device in accordance with the present invention.

FIG. 1 shows the setting device of the present invention which has a display 1 that is surrounded by a replaceable coverplate 2. The display 1 has at its left edge vertically arranged display lights 3, 4, 5, 6 for the individual functions of the setting device. The display 1 is provided along its upper edge with arrow-shaped indicator lights in the form of LCD-segments which have on the coverplate 2 the associated abbreviation for the days of the week. Further indicator lights 7 to 11 are arranged parallel to the bottom edge of the display, with keys 12 to 16 being associated with them in a clear manner via the corresponding arrows 7a to 11a on the coverplate 2. In the center of the display 1 there appear in customary segment display either the actual time, the connect time, the disconnect time or else markings or abbreviated designations corresponding to the function keys.

The individual stages of the function indication can be selected cyclically by means of a function key 17. The indicator light 3 corresponds to the actual time, the indicator light 4 to the switch times to be selected or already selected, the indicator light 5 to the permanent connection of the appliance to be controlled, and the indicator light 6 corresponds to a "party" connection. Further indicator lights 22, 23 at the right edge of the display 1 indicate the party connection as being set or not set.

In the function stage 3 for the setting of the actual time, the indicator light 3 is lit. There is also displayed the time setting and the corresponding indicator lights for the day, as well as the symbols for summer time/winter time. The time setting can now be corrected by actuating hour key 18 for the hours and minute key 19 for the minutes. After actuation of these keys 18, 19, the corresponding numbers or symbols will be lit continuously. The switching from the summer time to winter time takes place via SU/WI key 20. This provides the proper time to account for daylight savings time in the United States. The colon between the hour and the minute display of time serves as an indicator light. The upper dot of the colon is, for this purpose, surrounded by a winter symbol and the lower dot by a summer symbol. Upon actuation of SU/WI key 20, the corresponding symbol of the colon is lit continuously. The time is then set for either summer time or winter time.

When the function key 17 is pressed again, the indicator light 3 is extinguished and the indicator light 4 is lit continuously. In this way the previously set time is stored. At the same time, the indicator light 7, 8, 9 associated with the keys 12, 13, 14 flash. One can now select via Enter key 12 the function "Enter" switch times or via Read key 13 the function "Read" switch times or via Erase key 14 the function "Erase" switch times.

Figure 2:
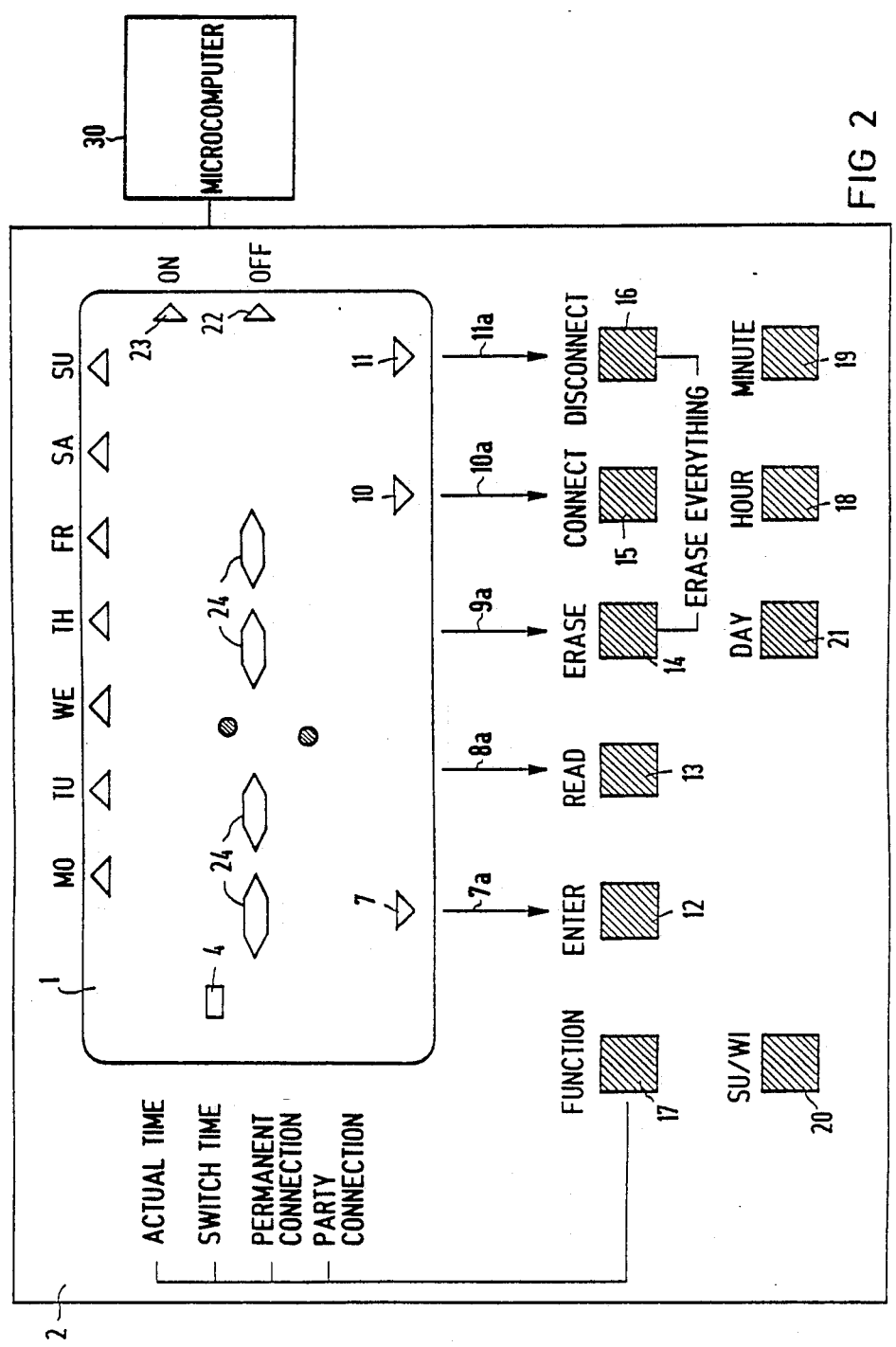
FIGS. 2, 3, 4 and 5 show different operating conditions of the setting device of FIG. 1.

As seen in FIG. 2, after pressing Enter key 12, indicator light 7 is lit continuously and indicator lights 8 and 9 are extinguished. The indicator lights for the days of the week MO to SU flash, while the colon is lit continuously and bar symbols 24 flash instead of the digital display for hours and minutes. The indicator lights 10, 23 and 11, 22 flash alternately.

By means of keys 18, 19 and day key 21, the switch times associated with the days of the week can now be selected. The corresponding indicator lights are then lit continuously. By means of day key 21 there can also be selected corresponding blocks of days which are shown in the display in accordance with the individual days, for instance the weekdays MO to FR. The indicator lights for MO, TU, WE, TH and FR are then simultaneously lit continuously. The switch time set for each day can then be selected as either a connect time or a disconnect time by connect key 15 and disconnect key 16. The indicator lights 10 and 11 are then extinguished and the appropriate indicator light 22 or 23 is lit continuously.

The actuating of keys 15, 16, 18, 19, 21 can take place in any desired sequence. As soon as all of the corresponding indicator lights are lit continuously, the switch time selected in each case will be automatically stored. Further switch times can be selected by again pressing Enter.

Figure 3:
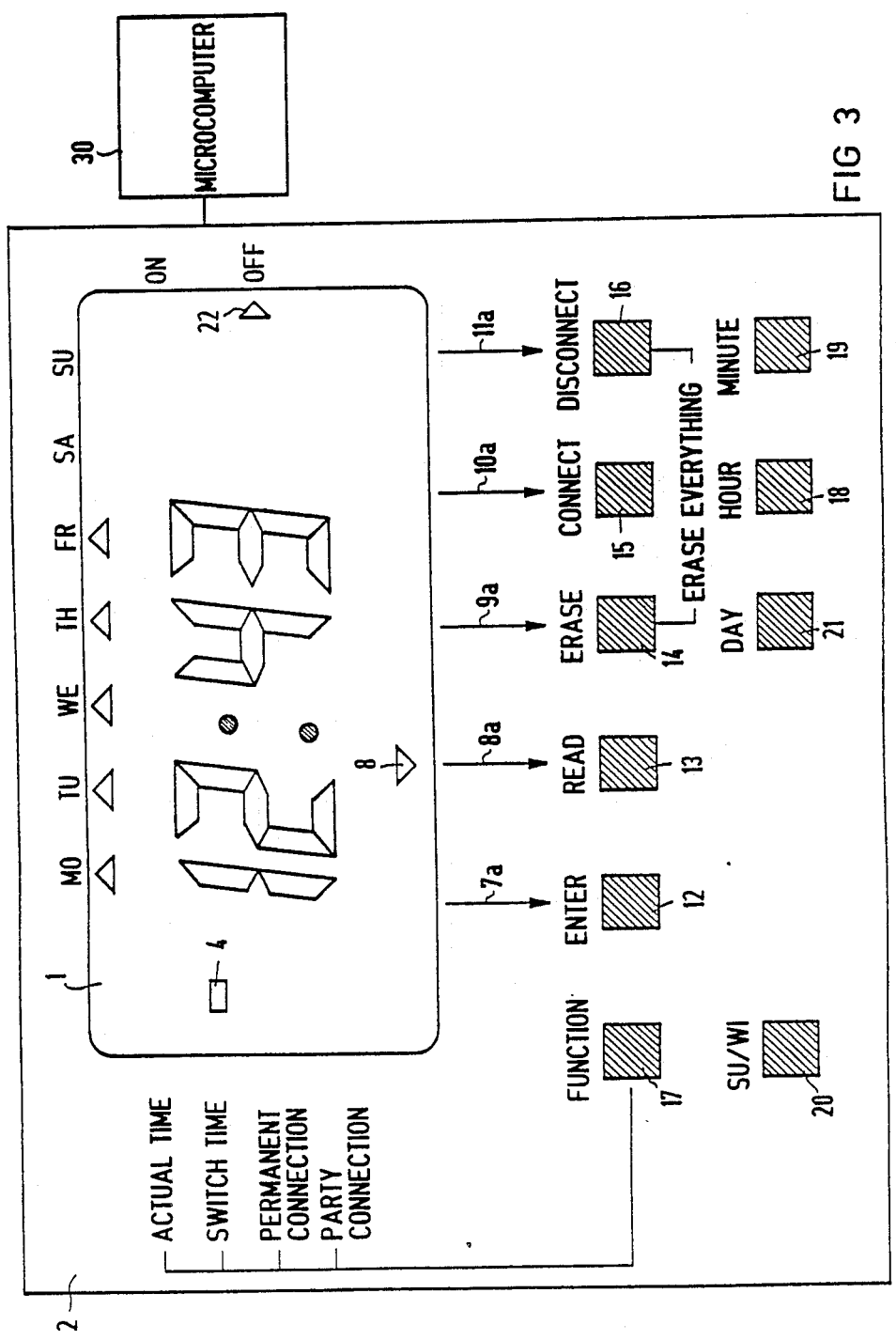

Read key 13 is pressed for reading the switch times selected. Indicator lights 7 and 9 are then extinguished, as shown in FIG. 3. The switch time is then shown by the constant indication of the hour and minute as well as by indicator lights for the day or days in question and the indicator light 23 for "On" or 22 for "Off". Further pressing of the Read key 13 will then display the next switch time.

Figure 4:
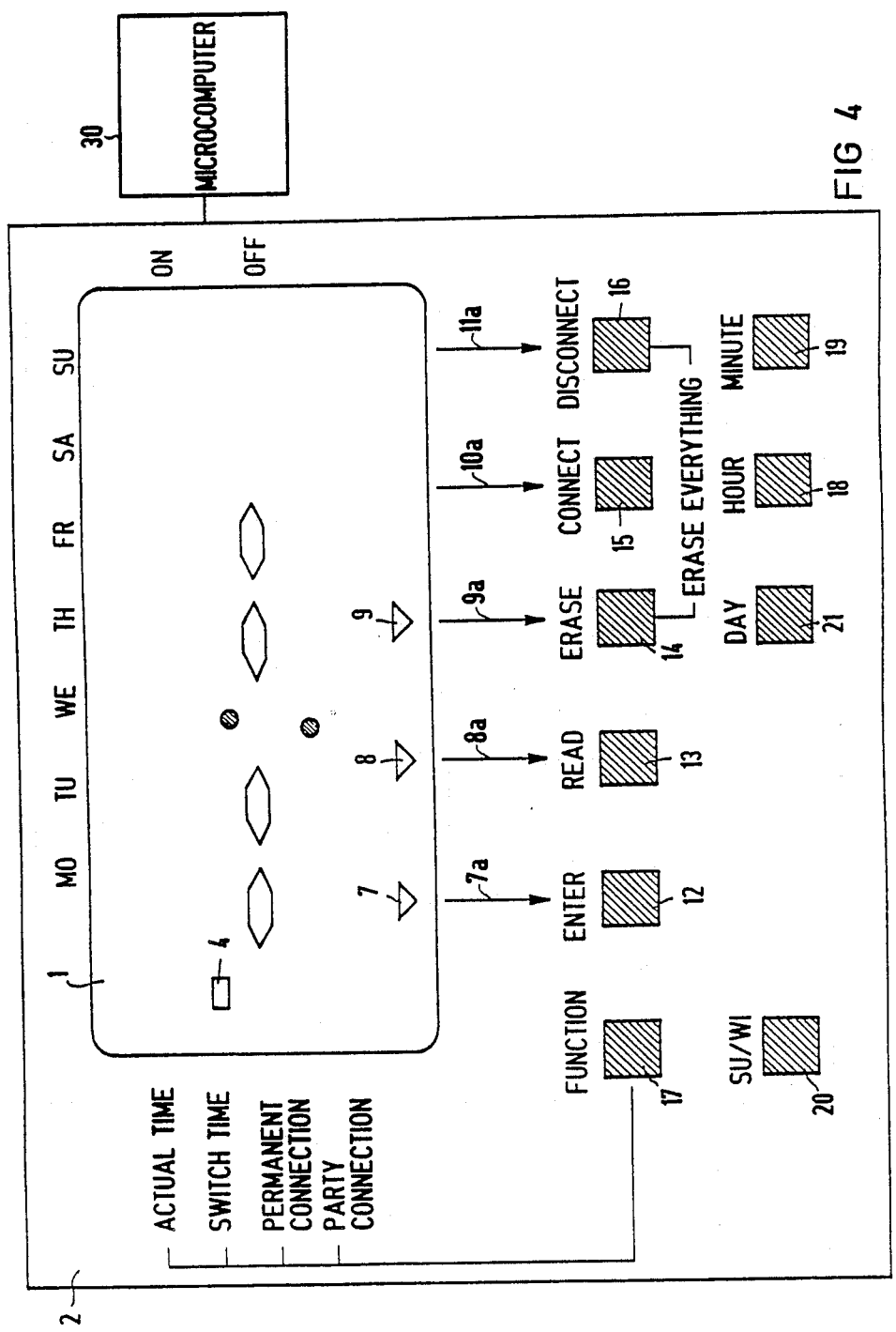

If a programming proves to be incorrect, the corresponding switch time can be erased by pressing Erase key 14, as seen in FIG. 4. In this case the indicator lights for the days, as well as 22 and 23 for "Off" or "On" respectively, are extinguished, and the bar symbols are displayed instead of the time. After about one second, the indicator lights 7, 8 and 9 start to flash. A new switch time can then be entered by pressing Enter key 12 and read by pressing Read key 13.

Upon completion of the programming for the connect and disconnect times, the function of selecting the switch times can either be abandoned by pressing Function key 17 or else this will take place automatically after about two minutes.

Figure 5:
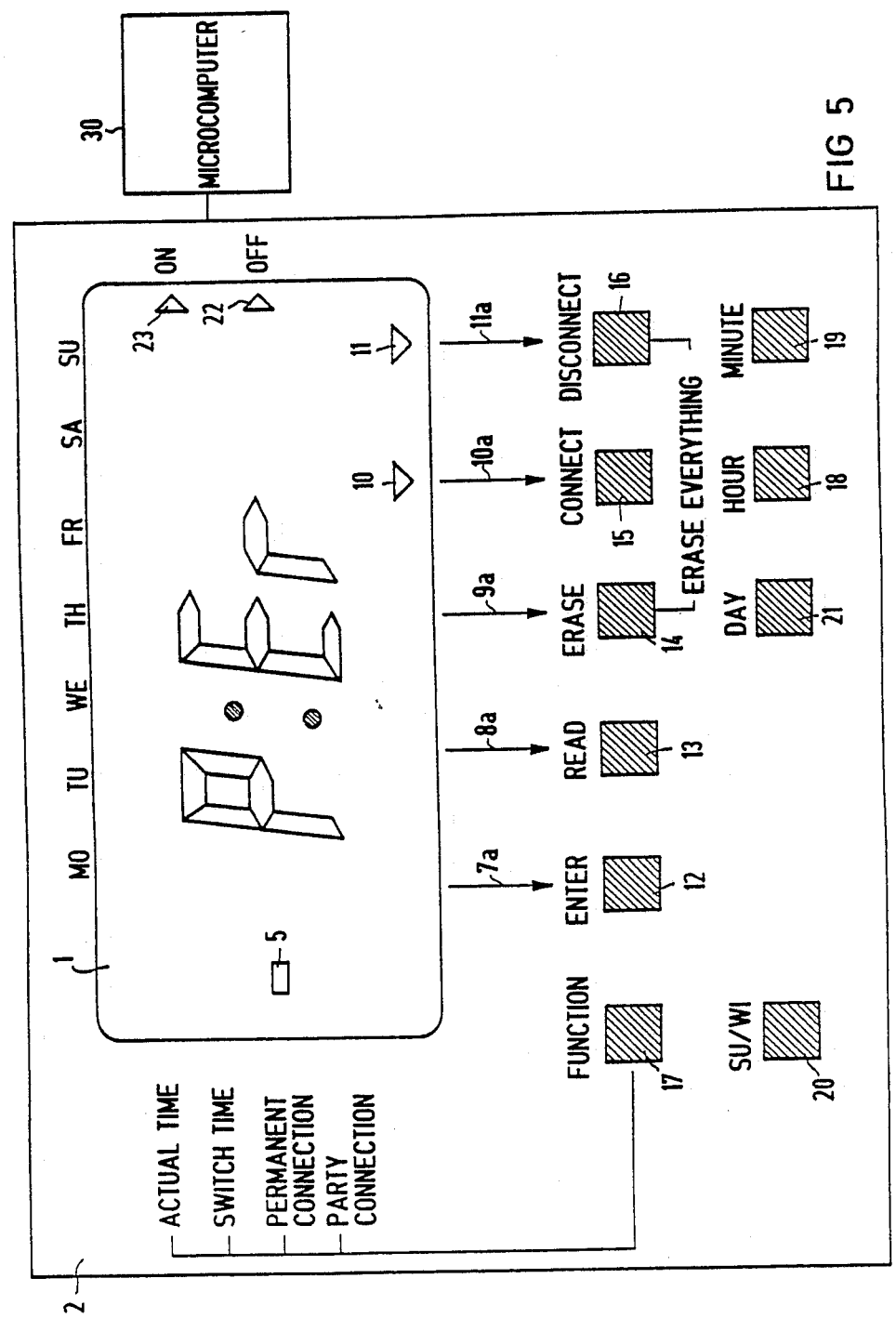

If for special reasons the connecting and disconnecting corresponding to the programmed times is not to take place and the device is to remain continuously connected or disconnected, the pressing of the function key 17 is repeated until the indicator light 5, indicating a permanent connection, lights up. The switch for the controllable device thus remains closed and instead of the actual time there appear the letters "P:Er" for "permanent" in the display. This is illustrated in FIG. 5. The sets of symbols 10, 23 or 11, 22 then light up alternately. The device can be connected or then light up alternately. The device can be connected or disconnected "permanently" by actuating either the connect key 15 or the disconnect key 16.

Figure 6:
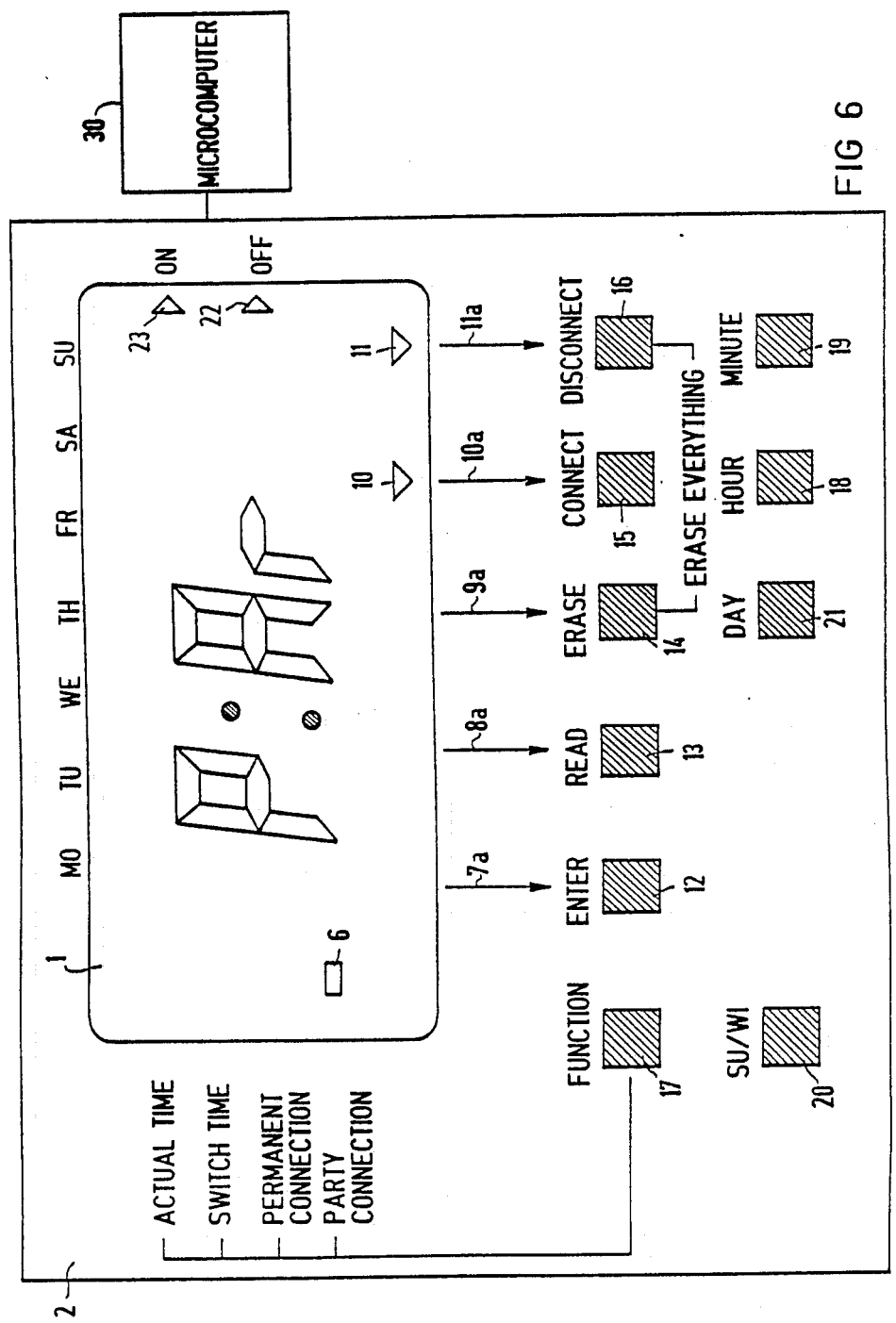

If a connection for a limited period of time is desired, independent of the actual program, the function key 17 is pressed again until the indicator light 6 lights up. In this case there appear in the display, instead of the actual time, the letters "P:Ar" for "party switching". This is shown in FIG. 6. The device can now be connected or disconnected until the next program switch time is reached. The set of symbols 10, 23 and 11, 22 light up alternately. The device is connected or disconnected permanently until the next switch time by actuating the appropriate key 15 or 16. The indicator light 6 is thereupon extinguished and the actual time again appears in the display.

If the entire program is to be erased and replaced by a new one, the erase key 14 and the disconnect key 16 are pressed simultaneously. Both keys are connected by a line bearing the legend erase everything on the coverplate 2.

The functions controlled by the actuation of the keys and the generation of the various displays is controlled by a standard microcomputer 30, the interfacing and programming of which would be within the level of one of ordinary skill in the art, when given the functioning of the time switch as described above. The microcomputer 30 will have storage and data and shift registers, as is conventional in microcomputers.

What is claimed:

1. A microcomputer controlled programmable time switch for connecting and disconnecting an electrically controllable device, comprising:
    a set of selection keys that select which data from data groups is to be set;
    a set of setting keys that have individual functions to set said selected data;
    a display that displays said data groups;
    indicator lights on said display that are associated with said setting keys, said indicator lights for said data groups having corresponding legends that are clearly associated with said indicator lights;
    a microcomputer, coupled to said selection keys and said setting keys, having data and shift registers coupled to said setting keys to receive input of said individual functions, with said selection keys providing cyclical selection of particular data from said data groups, said microcomputer having means for storing said data;
    wherein a first of said data groups is a function selection, a second of said data groups is the days of the week, and a third of said data groups is the time;
    wherein said data includes input, readout, erasing, and connecting and disconnecting of said device;
    wherein said microcomputer includes means for guiding data input by flashing said indicator lights, with unguided data inputs being enterable in any sequence; and
    wherein said microcomputer automatically stores data required for a complete data input after all such data has been selected.

2. The time switch according to claim 1, wherein each key is allocated only a single function.

3. The time switch according to claim 2, wherein one of said selection keys selects between summer time and winter time, and wherein said display has a two-dot colon between an indication of hours of minutes, said dots being indicator lights such that a first of said dots is surrounded by a symbol for the summer time and a second of said dots is surrounded by a symbol with the appropriate symbol being lit when one of the summer time or winter time is selected.

4. The time switch according to claim 3, wherein said setting keys include an Erase key and a disconnect key, and wherein said microcomputer includes means for erasing certain information stored in said microcomputer by simultaneously pressing said Erase key and said disconnect key.

5. The time switch according to claim 4, further comprising a coverplate surrounding said display and said keys, said coverplate having markings between certain of said indicator lights and associated keys, and having legends such that said legends associated with said keys and said indicator lights are interchangeable.

6. The time switch according to claim 5, wherein one of said functions to be selected is a party switching function in which the time switch remains closed until a next programmed switch point is reached, whereupon a selected program is continued and said party switching is erased.

* * * * *